Oct. 28, 1969

J. KELLY 3,475,152

BAFFLE ELEMENT FOR GLASS DRAWING APPARATUS

Filed July 6, 1965

INVENTOR.
JEAN KELLY

BY

Bauer and Seymour

ATTORNEYS

Oct. 28, 1969    J. KELLY    3,475,152
BAFFLE ELEMENT FOR GLASS DRAWING APPARATUS
Filed July 6, 1965    3 Sheets-Sheet 2
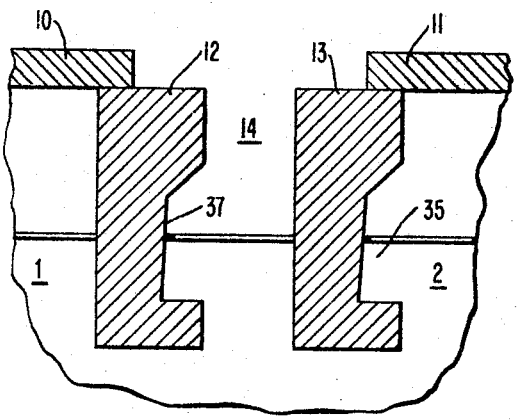
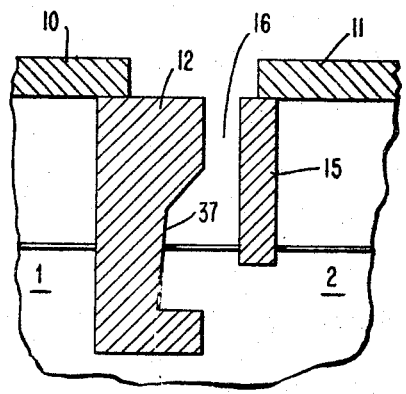
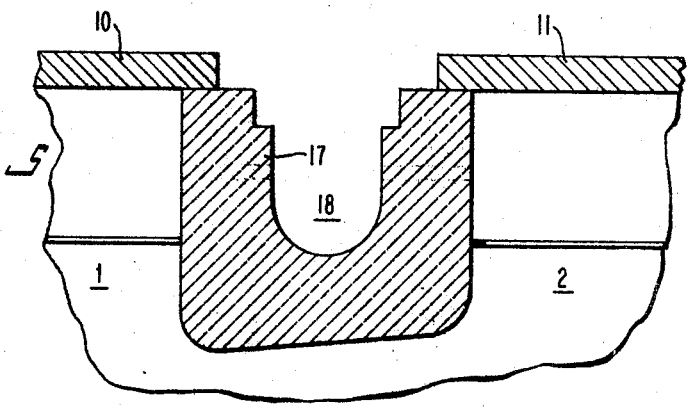
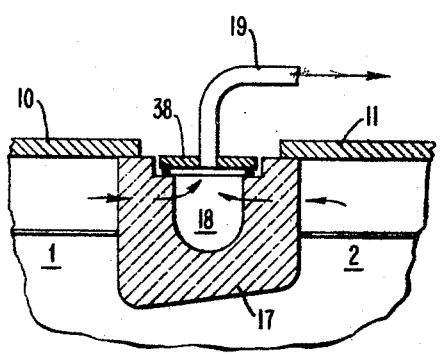
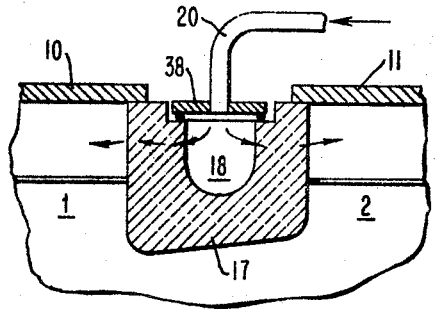
INVENTOR.
JEAN KELLY
BY Bauer and Seymour
ATTORNEYS United States Patent Office 3,475,152
Patented Oct. 28, 1969

3,475,152
BAFFLE ELEMENT FOR GLASS DRAWING
APPARATUS
Jean Kelly, Chalon-sur-Saone, France, assignor to Compagnie de Saint-Gobain, Neuilly-sur-Seine, France
Filed July 6, 1965, Ser. No. 469,439
Claims priority, application France, July 31, 1964, 983,787
Int. Cl. C03b 5/20, 15/02
U.S. Cl. 65—193                    5 Claims

ABSTRACT OF THE DISCLOSURE

Glass melting tank and draw-pot separated by a baffle element consisting of first and second vertical partitions spaced longitudinally of the tank and depending from the top wall thereof, to terminate in lower transverse edges below the normal level of molten glass and extending transversely of the direction of flow from tank to draw-pot. Gases evolving from the ingredients melted and fined in the tank and which would otherwise undesirably find their way into the draw-pot, collect in the space between the partitions and are exhausted to location externally of the tank. Alternatively the partitions may be integrally and continuously joined along their lower edges, below the level of molten glass, to define an enclosed chamber. Gas at pressure greater than that in the tank may then be introduced into the chamber to form a barrier preventing passage of evolved gases into the draw-pot.

---

The present invention relates to apparatus for producing sheet glass by drawing a continuous ribbon of glass from a bath of molten glass in accordance with sheet forming processes known in the art as the Pittsburgh and the Fourcault processes. In particular, the invention relates to means for preventing the gases, that emanate from molten glass in the melting tank of such apparatus, from diffusing into the drawing well of the apparatus.

In apparatus for carrying out the Pittsburgh and Fourcault processes of drawing glass the ingredients of the glass are melted, refined and conditioned in a furnace. The bath of molten glass thus formed in the furnace extends into a drawing well associated with the furnace and glass sheet is formed by drawing a continuous ribbon of glass up from the surface of the bath in the drawing well. The temperature of the glass during the drawing operation must be precisely controlled and cooling devices are arranged in the drawing well to solidify the glass drawn from the bath sufficiently for it to be drawn rapidly up through the drawing well.

The melting furnace and drawing well are next to each other and separated by a baffle element above the bath and extending down into it so that the baffle element separates the atmosphere in the oven from the atmosphere in the drawing well.

Due to the corrosive nature and high temperatures of the molten glass and the gases emanating from the glass, particularly as it is being refined and conditioned in the furnace, the baffle element must be made of a corrosion resistant refractory material such as alumina-silica blocks.

The bottom edge of the baffle element is normally immersed in the molten glass to prevent currents, which circulate in the portion of the bath in the furnace, from disturbing the portion of the bath in the drawing well. The baffle element also prevents entry into the drawing well of foreign matter floating on the surface of the glass in the furnace. In addition, the baffle element is intended to prevent gases emanating from the molten glass in the furnace from entering the drawing well where they would cause unwanted agitation and contamination of the atmosphere in the drawing chamber.

However, the baffle elements which have been used in apparatus of the type under consideration do not satisfactorily prevent hot gases in the furnace from entering the drawing well. This is due apparently to the porosity of the refractory materials, or to minute fissures in the material, or to fine joints between sections of the baffle element which it is practically impossible to seal tight. The entry of gases into the drawing well from the furnace is also facilitated by the fact that the pressure of the atmosphere in the furnace is greater than the pressure of the atmosphere in the drawing well.

The gases which are produced in the furnace contain volatile elements which, when the gases enter the drawing well, condense on the cooling devices and form whitish powdery deposits. These deposits are materials such as sulfates of sodium and oxides of arsenic and as they build up they reduce the efficiency of heat exchange between the cooling devices and the glass being drawn from the bath. Moreover, these deposits tend to flake off in patches. This disrupts the desired uniformity of cooling by the cooling devices and the particles which flake off stick to the surface of the glass being drawn and produce a defective condition referred to as "scale." It is therefore necessary to take the apparatus out of operation at regular intervals, either to replace the cooling devices or to scour them to remove the accumulated deposits. Thus, the entry of gases into the drawing well with consequent condensation on the cooling surfaces interferes with the proper operation of the apparatus and reduces production.

It is an object of the present invention to prevent gases produced in the furnace of apparatus of the type described from entering the drawing well.

Another object is to provide an improved baffle element between the furnace and drawing well which is adapted for the passage of gases from the furnace out through the baffle element to the outside of the apparatus rather than into the drawing well.

Another object is to provide an improved baffle element through which gases are drawn out of the furnace and out of the drawing well.

Another object is to provide an improved baffle element in which the passage of gases from the furnace through the baffle element into the drawing well is blocked by a stream of air conducted into the interior of the baffle element.

The improved baffle element of the present invention may be made of the usual corrosion resistant refractory material which has previously been used and through which it has been impossible to prevent the penetration of gases from the furnace. It is arranged across the top portion of the chamber formed by the furnace and drawing well, above the bath of molten glass therein, and the bottom edge is submerged in the bath.

In accordance with the invention the baffle element is provided with a vertical slot therein opening to the outside of the chamber formed by the furnace and drawing well. The slot extends the length of the baffle element and down inside it at least to the level of the bath. In one embodiment the baffle element is formed of a pair of walls spaced apart so that the slot is provided by the space between the walls. In another embodiment the baffle element is a single piece with a deep groove formed therein to provide the slot. With baffle elements in accordance with the invention, gases which penetrate the baffle element from the oven enter the slot and are removed therefrom to the outside rather than being permitted to pass through to the drawing well as was previously the case. The pressure of atmosphere within the furnace is normally greater than the atmosphere in the slot so that the gases penetrating the baffle element will tend to pass out through the slot rather than penetrate through to the drawing well.

In one embodiment gases are conducted out of the slot to the outside of the apparatus by a circulating flow of air through the slot. Alternatively, the gases may be drawn out of the slot by suction.

In another embodiment gases from the furnace are prevented from penetrating the baffle element at all by means provided for directing a stream of air into the slot. The air thus directed into the slot opposes the passage of gases from the furnace into the baffle element and the pressure of the stream of air may be made sufficient to reverse the usual flow and cause the air to pass from the slot through the material of the baffle element and into the furnace (and into the drawing well).

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention, reference for this latter purpose being had primarily to the appended claims.

In the drawings, wherein like reference characters refer to like parts throughout the several views, FIGURE 1 is a view of a longitudinal vertical section through apparatus of the Pittsburgh type showing one embodiment of a baffle element in accordance with the present invention;

FIGURE 3 is a view of a transverse vertical section through a second embodiment of a baffle element in accordance with the invention;

FIGURE 4 is a view similar to FIGURE 3 illustrating a variation of the embodiment shown in FIGURE 3;

FIGURE 5 is a view of a transverse vertical section through a third embodiment of a baffle element in accordance with the invention;

FIGURE 6 is a view similar to FIGURE 5 showing a tube joined to the slot to apply suction to the slot;

FIGURE 7 is a view similar to FIGURE 6 but showing the tube joined to the slot for conducting a stream of air into the slot;

Figure 1:
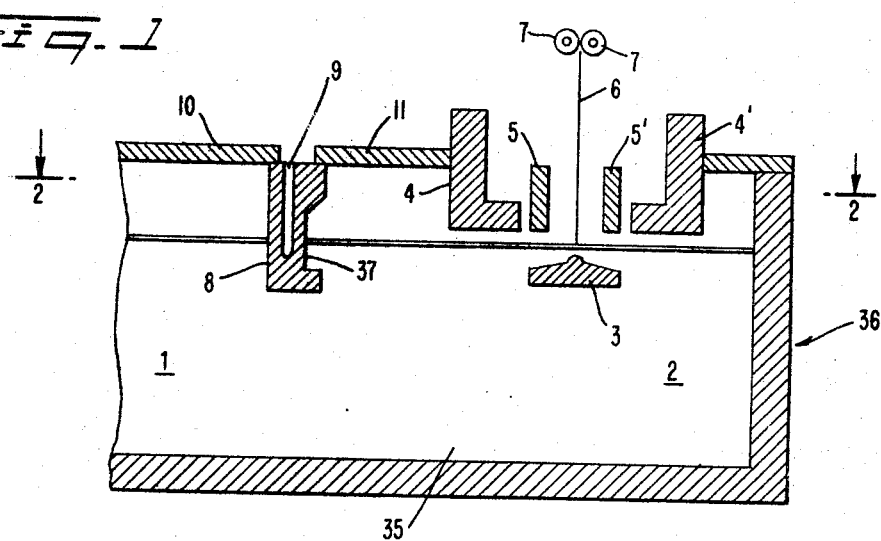
Figure 2:
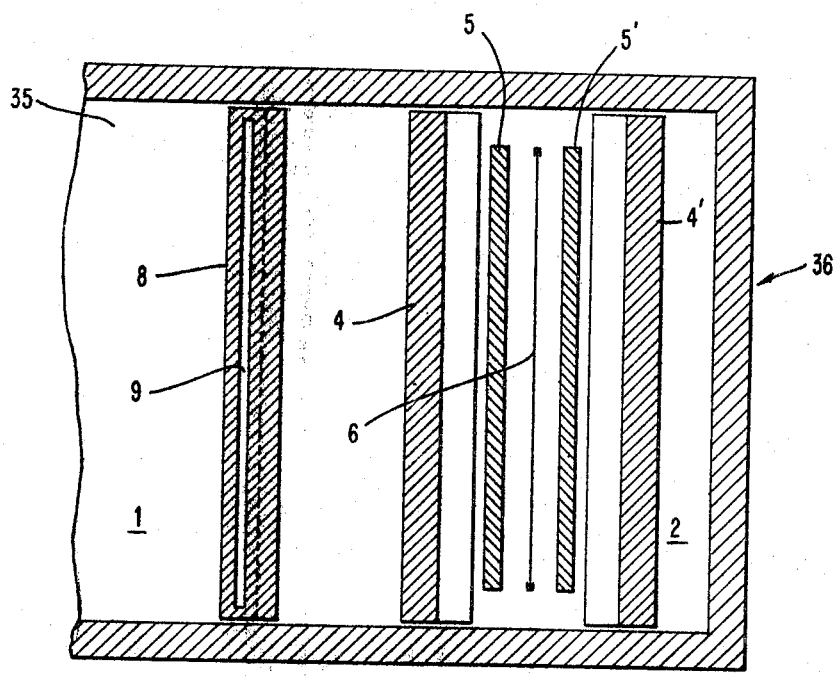
FIGURE 2 is a top plan view along lines 2—2 of FIGURE 1.

Referring now to the drawings, FIGURES 1 and 2 illustrate sheet glass drawing apparatus of the Pittsburgh type. As in other types of drawing apparatus (such as the Fourcault type shown in FIGURES 8 and 9) a bath of molten glass 35 is contained in a chamber 36 comprising an oven or melting furnace 1 and drap-pot or well 2 which are arranged so that the bath of molten glass formed by melting the ingredients for the glass together in the furnace 1 extends into the draw-pot or well 2. Heat for the furnace is normally provided by gas burners, not shown. The glass is also refined and conditioned in the furnace.

Apparatus of the Pittsburgh type is characterized by a draw bar 3, which as shown, is submerged under the surface of the molten glass in the drawing well 2. The drawing well opens through the top of the chamber 36 and is provided with oppositely facing L-shaped side walls 4 and 4' spaced apart to define a drawing zone above the surface of the glass. Cooling devices 5 and 5' are spaced apart between the walls 4 and 4' to solidify and condition a ribbon of glass 6 which is drawn up between them by rollers 7.

In accordance with the present invention a baffle element 8 comprises partitions spaced in the direction of flow of molten glass from melting tank to draw-pot, and defining between them a vertical slot 9 extending across the chamber 36 between the oven 1 and the draw-pot 2. The baffle element 8 extends down from the top of the chamber 36 and its bottom edge is submerged below the surface of the mass of molten glass 35. As seen in FIGURE 2, the slot 9 extends the length of the baffle element and down inside it to a point below the surface of the bath. The slot opens through the top of the baffle element and is open to the outside of the chamber 36 through an open space provided between sections 10 and 11 of the top wall of the chamber.

In the drawing, the wall of the baffle element 8 toward the drawing well 2 is shown indented at 37. This configuration is provided as means to reduce disruptive currents in the portion of the glass bath in the drawing well 2 and forms no part of the present invention.

The baffle element 8 illustrated in FIGURES 1 and 2 may be made of a single block with a groove formed therein to provide the slot 9. In this case, the bottom of the baffle element 8 is closed to form an enclosed space.

Looking now at FIGURE 3, a form of baffle heretofore used in apparatus of the type concerned is illustrated by the partition 12. In this figure the baffle element of the invention is formed by placing a partition 13 parallel to and spaced apart from the partition 12 so as to form a space 14 which provides the interior slot in the baffle element in accordance with the invention. In FIGURE 3, the partition 13 is a duplicate of the partition 12, but as illustrated in FIGURE 4 the particular configuration of the partition is not critical to the invention and in the variation of FIGURE 4 a partition 15, which is rectangular in cross section, is spaced from the partition 12 to provide an internal slot 16 therebetween.

The baffle element 17 shown in FIGURE 5 is generally similar to the baffle element 8 of FIGURE 1 in that it is a single block which is grooved to provide the interior slot 18. The embodiment shown in FIGURE 5 is wider and has a wider slot to give added mechanical strength and to provide a more open slot to facilitate the circulation of air through it to carry away more rapidly the gases which diffuse into the slot from the furnace.

FIGURES 6 and 7 show tubes 19 and 20 respectively secured in communication with the slot 18 in the baffle element 17 by being fixed respectively through a cover plate 38 over the opening of the slot 18. As indicated in FIGURE 6, the tube 19 is connected to a source of suction, not shown, so that a partial vacuum is created in the slot 18 which causes gases from the furnace 1 and from the drawing well 2 to diffuse through the walls of the baffle element 17 in the direction of the arrows into the slot 18 from which the gases are drawn through the tube 19.

In FIGURE 7 the tube 20, as indicated, is connected to a stream of air which is conducted into the slot 18. The pressure of the air in the slot causes the air to diffuse through the walls of the baffle element into the furnace and into the drawing well as indicated by the arrows and thereby prevent penetration of the baffle element by the gases in the furnace.

Figure 8:
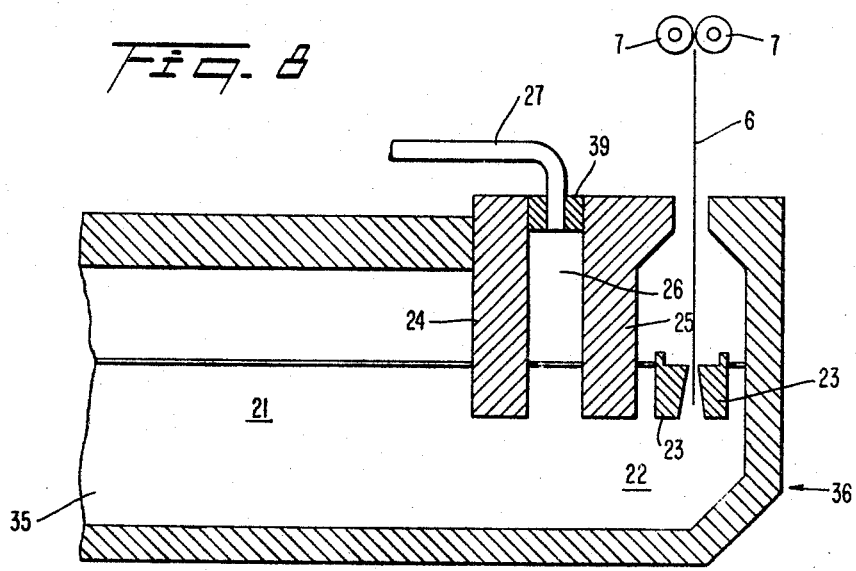
FIGURE 8 is a view of a longitudinal vertical section through apparatus of the Fourcault type including one embodiment of a baffle element in accordance with this invention.
Figure 9:
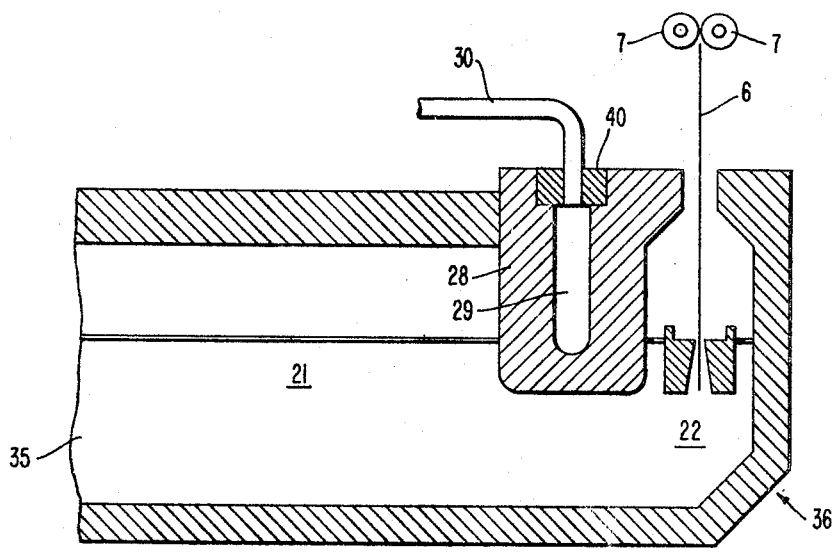
FIGURE 9 is a view similar to FIGURE 8 showing another embodiment of a baffle element in accordance with the invention used in the apparatus.

FIGURES 8 and 9 show embodiments of baffle elements in accordance with the invention used in drawing apparatus of the Fourcault type. This apparatus is distinguished by a feed block comprising a pair of spaced apart blocks 23 in the drawing well 22. The blocks 23 are partially submerged in the bath of molten glass 35 and a continuous ribbon of glass 6 is drawn from the molten glass between the blocks 23 by rollers 7.

In the embodiment of FIGURE 8, the baffle element in accordance with the invention is formed by a pair of partitions 24 and 25 spaced apart to provide a slot 26 between them. As shown, the partition 25 forms one side wall of the portion of the drawing well 22 above the bath through which the ribbon 6 of glass is drawn. Cooling devices, such as the cooling devices 5-5' shown in FIGURE 1 may be provided as separate elements adjacent the ribbon 6 or may be incorporated in the walls of the drawing well.

A tube 27 is shown connected through a plug 39 in the upper end of the slot 26 as means to apply suction or a stream of air to the slot 26 for the purposes explained with respect to FIGURES 6 and 7.

In FIGURE 9 the baffle element 28 is a single piece with a slot 29 cut or molded therein. This embodiment is therefore similar to the embodiments shown in FIGURES 1-2, and 5-7. As in the embodiment of FIGURE 8, a tube 30 is connected through a plug 40 to the slot 29 to connect the slot with a source of suction or to a stream of air.

In each of the above-described embodiments of the baffle element of the present invention the slot provided in the element is instrumental in preventing the undesired diffusion of gases from the furnace into the drawing well. When air is forced into the slot the force of the air opposes passage of gases through the baffle element. Alternatively, when the gases are permitted to penetrate the baffle element, either by natural flow or by suction applied to the slot, the gases collect in the slot and do not pass through into the drawing well. The gases in the slot are then carried out of the apparatus by circulation of air (natural or forced) through the slot or by being drawn out by suction.

What is claimed is:

1. Glass drawing apparatus comprising a covered melting tank in which glass-making ingredients are melted and fined, and flow in one direction toward a drawing chamber, a baffle element comprising first and second vertical, gas permeable partitions extending across the furnace from the cover of said tank into the glass, thereby defining a vertically and transversely extending barrier chamber between the cover and the glass for the collection of gases, said second partition defining a drawing chamber, and said first partition defining the melting zone, aperture means connecting the barrier chamber to a gaseous zone outside the furnace, means for drawing molten glass sheet from the drawing chamber, and means adjacent the drawing chamber and contiguous to the gases therefrom to cool the drawn sheet.

2. The apparatus of claim 1, said aperture means comprising a passageway through said top wall to furnace room air.

3. The apparatus of claim 1, said partitions being integrally and continuously connected at and along their portions below said level, to enclose said space between said partitions.

4. The apparatus of claim 3, said aperture means comprising means for supplying gas under pressure into said space.

5. The apparatus of claim 1, said aperture means comprising means for exhausting gas from said space, under subatmospheric pressure.

References Cited

UNITED STATES PATENTS

| | | | |
|---|---|---|---|
| 1,598,308 | 8/1926 | Pike | 65—346 XR |
| 1,751,045 | 3/1930 | Mambourg | 65—345 |
| 1,816,036 | 7/1931 | Zellers | 65—202 |
| 1,956,170 | 4/1934 | Gregorius | 65—345 XR |
| 1,980,992 | 11/1934 | Halbach | 65—345 XR |
| 2,085,328 | 6/1937 | Peiler | 65—346 |
| 2,268,247 | 12/1941 | Fox | 65—121 XR |
| 3,137,559 | 6/1964 | Van Praet | 65—343 |

S. LEON BASHORE, Primary Examiner

FRANK W. MIGA, Assistant Examiner

U.S. Cl. X.R.

65—121, 202, 337, 339, 345